Figure 1:
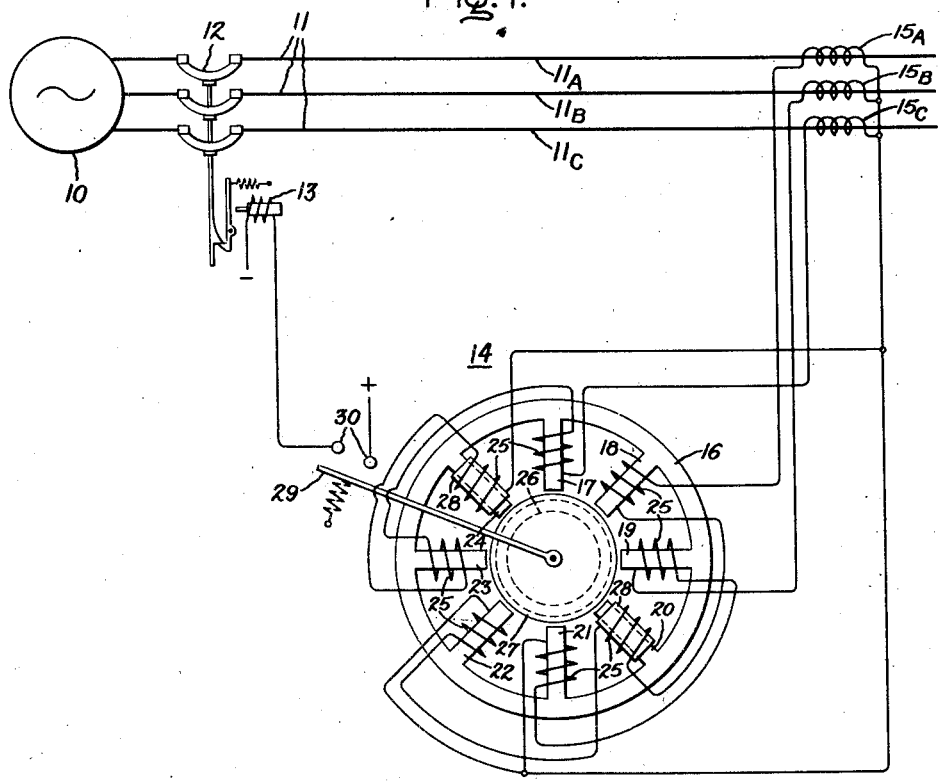

March 24, 1942.  A. J. McCONNELL  2,277,522

PHASE-SEQUENCE APPARATUS

Filed May 4, 1940

Inventor:
Andrew J. McConnell,
by Harry E. Dunham
His Attorney.

Patented Mar. 24, 1942

2,277,522

UNITED STATES PATENT OFFICE 2,277,522

PHASE-SEQUENCE APPARATUS

Andrew J. McConnell, Upper Darby, Pa., assignor to General Electric Company, a corporation of New York Application May 4, 1940, Serial No. 333,377

12 Claims. (Cl. 175—294)

My invention relates to polyphase alternating-current apparatus and particularly to such apparatus in which an electrical quantity, such as the positive or negative symmetrical component of current or voltage, is utilized to control an electroresponsive device or relay.

It is well known in the art that any unsymmetrical three-phase system may be resolved into an asymmetrical system and two symmetrical polyphase systems, one of which has the same phase rotation as the unsymmetrical system and the other the opposite phase rotation.

These so-called phase-sequence components of a polyphase circuit have been proposed for measuring purposes, relay operation, and the like. In most of the prior-art arrangements, it has been necessary to provide means for segregating or isolating these phase-sequence components which has been accomplished, for example, by means of a polyphase motor with a synchronously rotating squirrel-cage rotor. This particular arrangement has certain disadvantages because the slots of the machine cause numerous higher harmonics of considerable amplitude which adversely affect the measurements or relay operation as the case may be. Complicated networks or filters consisting of inductances or capacitances and ohmic resistances have also been provided for sifting or isolating the phase-sequence components. It would be desirable to provide a phase-sequence relay which would not require complicated means for segregating or isolating the phase-sequence components to which said relay is to respond.

For open-phase protection of motors and other translating apparatus, many more or less complicated relay schemes have been provided, one of the more common being the current balance relay in which each phase current is balanced against another phase current. It would be desirable to provide a relay for open-phase protection which is simple and compact, economical to manufacture and produces more torque than was available heretofore in relays of the prior art for open-phase protection.

It is, accordingly, an object of my invention to provide a new and improved phase-sequence relay which is simple and compact and which dispenses with complicated networks and the like.

It is another object of my invention to provide a relay for open-phase protection operating in accordance with the phase-sequence components of the system, which is very economical to manufacture being relatively small and compact while at the same time producing sufficient torque for proper relay operation.

Further objects and advantages of my invention will become apparent as the following description proceeds and the features of novelty which characterize my invention will be pointed out with particularity in the claims annexed to and forming a part of this specification.

Figure 2:
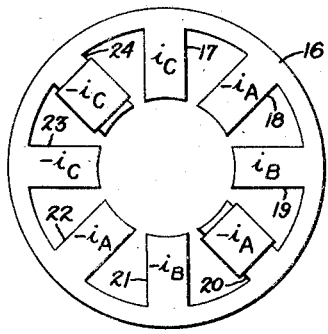
Figure 3:
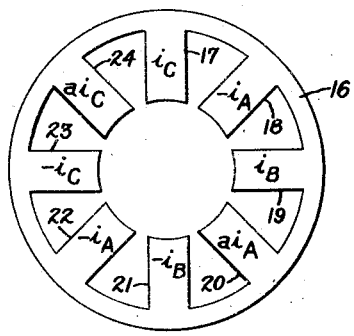

For a better understanding of my invention, reference may be had to the accompanying drawing in which Fig. 1 is a schematic diagram of a circuit embodying my invention, and Figs. 2 and 3 illustrate the energization of the windings of the relay disclosed in Fig. 1.

While my invention is of general application in relation to the use of phase-sequence components for relaying purposes, in order to illustrate my invention I have shown and described a negative-phase-sequence current relay which is particularly useful for automatically disconnecting an electric motor or other translating device from a polyphase circuit upon the opening of one of the phases of the circuit.

Referring now to Fig. 1, I have illustrated an electric motor or other translating device generally indicated at $10$ connected to a polyphase circuit $11$, illustrated as comprising three phase conductors $11_A$, $11_B$, and $11_C$, respectively, through a latched closed circuit breaker $12$ provided with a suitable trip coil $13$. An electroresponsive device or relay $14$ is provided for controlling the operation of circuit breaker $12$ in response to the negative-phase-sequence current component flowing in polyphase circuit $11$ under unbalanced current conditions. This relay or electroresponsive device $14$ is arranged to be energized from current transformers $15_A$, $15_B$, and $15_C$ having their secondary windings connected in star relationship, and each of which is associated with one of the respective phases $11_A$, $11_B$, and $11_C$ connected to translating device or motor $10$.

Electroresponsive device $14$ is preferably a protective relay of the type disclosed and claimed in United States Letters Patents 2,110,655 and 2,110,686 granted March 8, 1938, upon applications of E. H. Bancker and V. E. Verrall, respectively, and assigned to the assignee of the present application. In the above-mentioned patents, there is disclosed a construction wherein the actuation of a single rotor is controlled by windings on the radially disposed salients of a magnetic member. The structural details of this relay are clearly disclosed in the above-mentioned patents and form no part of this invention so a detailed description thereof will not be included herein and, in Fig. 1, this relay is only schematically shown. As shown in Fig. 1, this device comprises a hollow magnetic stator 16 having a plurality of inwardly projecting salients 17 to 24, inclusive. Windings 25 are provided for energizing the salients and also a central magnetic member 26 concentrically positioned with respect to the ends of the salients whereby to actuate a cup shaped rotor 27 which is movable in the gaps between the salients and the member 26. Two of the salients or poles, namely, 20 and 24, are provided with copper sleeves 28 around which the coils 25 are wound and which function like shading coils. By this arrangement, the air-gap flux of salients 20 and 24 is caused to lag the total flux produced by salients 20 and 24 which includes the leakage flux. In order that electroresponsive device 14 functions as described hereinafter, this shading arrangement is so constructed that the air-gap flux of salients 20 and 24 lags the total flux including leakage by sixty electrical degrees.

In order to control the operation of circuit breaker 12, electroresponsive device 14 is provided with a switching member 29 arranged to be operated by rotation of rotor 27 to bridge contacts 30 whereupon trip coil 13 of circuit breaker 12 is energized.

In order that electroresponsive device 14 is responsive to the negative-phase-sequence component of current in phase conductors 11A, 11B, and 11C, the windings 25 associated with the salients or poles 17 to 24, respectively, are so arranged as to be energized with currents $i_A$, $i_B$, or $i_C$ as shown in Fig. 2, the subscript denoting the phase of the polyphase circuit from which the particular winding is energized while the sign preceding the current represents the direction of current flow. $i_A$, $i_B$, and $i_C$ represent instantaneous values of these currents as will be understood by those skilled in the art. Since salients 20 and 24 are provided with a shading arrangement 28, the useful flux produced thereby is not in phase with the currents but, as set forth above, in the particular arrangement described, lags the current by sixty electrical degrees. A flux vector lagging the current by sixty degrees may be represented by a vector leading by one hundred and twenty degrees but reversed in direction. Therefore, the shaded pole 20 represented in Fig. 2 as energized by a current $i_A$ can be represented mathematically by $ai_A$, wherein the operator $a$ is a vector which rotates another vector through an angle of one hundred and twenty degrees in the positive or phase-advancing direction. Similarly, shaded pole 24 can be represented as energized by a component of current $ai_C$. Accordingly, in Fig. 3, the poles or salients 17 to 24 are designated as energized by currents although actually the flux is shifted in poles 20 and 24 rather than the current.

It will be understood by those skilled in the art that the torque on rotor 27 due to the interaction of the fluxes produced by the windings on any two salients, for example, salients 17 and 18, will be equal to a function of the product of the currents flowing in the respective windings multiplied by the sine of the angle between these currents. Referring now to Fig. 3, electroresponsive device 14 is energized so that the windings associated with salients 17, 18, and 19 and 21, 22, and 23 produce a restraining torque on rotor 27 while the interaction of the fluxes produced by the windings associated with salients 17, 24, 23 and 21, 20, 19 produce an operating torque on rotor 27. It will be understood that the interaction of the fluxes produced by windings not adjacent one another also produce extraneous torques. However, the torque of adjacent pairs of poles is large relative to that of any other pairs and the torques due to windings which are not adjacent but still appreciable are balanced out to substantially zero by the particular arrangements of connections of these windings.

In order to prove that electroresponsive device 14 will operate as a negative-phase-sequence current relay when energized as shown in Figs. 1 to 3, the mathematical equations for the torque on rotor 27 will be developed for the perfectly general situation where the phase currents in transmission line 11 may have any magnitude and phase position relative to one another. Referring now to Fig. 3, there are really only four pairs of poles that need to be considered in calculating the torque on rotor 27 since the other pairs of poles are in effect duplicates and merely change the torque by a factor of two. Assuming that torque on rotor 27 in a counterclockwise direction is positive, the four pairs of poles which will be considered are 24—23, 23—22, 22—21, and 21—20. These pairs of poles producing torque on rotor 27 may be considered to be four individual relays, each with poles $x$ and $y$ corresponding to 24 and 23, respectively, 23 and 22, respectively, 22 and 21, respectively, etc. As may be observed from Fig. 3, the electrical quantities supplied to these four fictitious relays are as follows:

*Table I*

| Salients | Pole $x$ | Pole $y$ |
|---|---|---|
| 24–23 | $ai_C$ | $-i_C$ |
| 23–22 | $-i_C$ | $-i_A$ |
| 22–21 | $-i_A$ | $-i_B$ |
| 21–20 | $-i_B$ | $ai_A$ |

As was mentioned above, any unsymmetrical three-phase system can be resolved into an asymmetrical system and two symmetrical three-phase systems, one of which has the same phase rotation as the asymmetrical system and the other the opposite phase rotation. As will be understood by those skilled in the art, the current in each of the secondary windings of current transformers 15A, 15B, and 15C may be resolved into positive, negative, and zero-phase-sequence components. Therefore, in each of the respective phases A, B, and C wherein the currents $i_A$, $i_B$, and $i_C$ are found, there may be zero-phase-sequence currents $i_{A0}$, $i_{B0}$, and $i_{C0}$, respectively, which three currents are all equal and in phase. In the case of a Y-connected system provided with a neutral connection, the sum of these three currents results in a current $3i_{A0}$ in the neutral. There is also a positive-phase-sequence current $i_{A1}$ in phase A, a corresponding current $a^2 i_{A1}$ in phase B, and a corresponding current $ai_{A1}$ in phase C, the operator $a$ signifying the rotation of a vector through the angle of 120° in the positive or phase-advancing direction, and the operator $a^2$ signifying 240° of rotation. Similarly there is a negative phase sequence current $i_{A2}$ in phase A, a corresponding current $ai_{A2}$ in phase B and a corresponding current $a^2i_{A2}$ in phase C. In terms of symmetrical components, therefore, the phase currents $i_A$, $i_B$, and $i_C$ may be expressed as follows:

$$i_A = i_{A0} + i_{A1} + i_{A2} \quad (1a)$$
$$i_B = i_{A0} + a^2 i_{A1} + a i_{A2} \quad (1b)$$
$$i_C = i_{A0} + a i_{A1} + a^2 i_{A2} \quad (1c)$$

Hereinafter, for purposes of simplication, the subscript A associated with the phase-sequence components will be omitted so that the equations read as follows:

$$i_A = i_0 + i_1 + i_2 \quad (1)$$
$$i_B = i_0 + a^2 i_1 + a i_2 \quad (2)$$
$$i_C = i_0 + a i_1 + a^2 i_2 \quad (3)$$

The phase currents for poles $x$ and $y$ of Table I may now be written in terms of symmetrical components from Equations 1, 2, and 3.

*Table II*

| Salients | Pole $x$ | Pole $y$ |
|---|---|---|
| 24–23 | $ai_0 + a^2 i_1 + i_2$ | $-i_0 - ai_1 - a^2 i_2$ |
| 23–22 | $-i_0 - a i_1 - a^2 i_2$ | $-i_0 - i_1 - i_2$ |
| 22–21 | $-i_0 - i_1 - i_2$ | $-i_0 - a^2 i_1 - a i_2$ |
| 21–20 | $-i_0 - a^2 i_1 - a i_2$ | $a i_0 + a i_1 + a i_2$ |

Since, in Table II, each term or component of current associated with pole $x$ reacts with each component or term of pole $y$, one may consider that there are thirty-six individual relays, each having a pole $x$ and a pole $y$ producing torque on rotor 27 and energized in accordance with the tabulation set forth in Table III below:

*Table III*

| Row | Salients | Column (1) Pole $x$ | Column (1) Pole $y$ | Column (2) Pole $x$ | Column (2) Pole $y$ | Column (3) Pole $x$ | Column (3) Pole $y$ |
|---|---|---|---|---|---|---|---|
| 1 | 24–23 | $ai_0$ | $-i_0$ | $ai_0$ | $-ai_1$ | $ai_0$ | $-a^2 i_2$ |
| 2 | 24–23 | $a^2 i_1$ | $-i_0$ | $a^2 i_1$ | $-ai_1$ | $a^2 i_1$ | $-a^2 i_2$ |
| 3 | 24–23 | $i_2$ | $-i_0$ | $i_2$ | $-ai_1$ | $i_2$ | $-a^2 i_2$ |
| 4 | 23–22 | $-i_0$ | $-i_0$ | $-i_0$ | $-i_1$ | $-i_0$ | $-i_2$ |
| 5 | 23–22 | $-ai_1$ | $-i_0$ | $-ai_1$ | $-i_1$ | $-ai_1$ | $-i_2$ |
| 6 | 23–22 | $-a^2 i_2$ | $-i_0$ | $-a^2 i_2$ | $-i_1$ | $-a^2 i_2$ | $-i_2$ |
| 7 | 22–21 | $-i_0$ | $-i_0$ | $-i_0$ | $-a^2 i_1$ | $-i_0$ | $-ai_2$ |
| 8 | 22–21 | $-i_1$ | $-i_0$ | $-i_1$ | $-a^2 i_1$ | $-i_1$ | $-ai_2$ |
| 9 | 22–21 | $-i_2$ | $-i_0$ | $-i_2$ | $-a^2 i_1$ | $-i_2$ | $-ai_2$ |
| 10 | 21–20 | $-i_0$ | $ai_0$ | $-i_0$ | $ai_1$ | $-i_0$ | $ai_2$ |
| 11 | 21–20 | $-a^2 i_1$ | $ai_0$ | $-a^2 i_1$ | $ai_1$ | $-a^2 i_1$ | $ai_2$ |
| 12 | 21–20 | $-ai_2$ | $ai_0$ | $-ai_2$ | $ai_1$ | $-ai_2$ | $ai_2$ |

Since each of the thirty-six individual fictitious relays of Table III produce separate torques on rotor 27, it will, of course, be understood that, if both of the currents associated with poles $x$ and $y$ of a particular relay are rotated by the same angle, the same torque will be obtained as if the currents were not rotated. For example, the torques in the following two relays are identical:

| Relay | Pole $x$ | Pole $y$ |
|---|---|---|
| 1 | $ai_0$ | $-ai_1$ |
| 2 | $i_0$ | $-i_1$ |

In relay 2, the current associated with poles $x$ and $y$ have been rotated 240° in the positive or leading direction with respect to the currents of relay 1. Accordingly, the currents associated with poles $x$ and $y$ of the thirty-six relays of Table III may be rearranged so that only $i_0$, $i_1$, or $i_2$ appear under pole $x$. This is accomplished by rotating both currents associated with a particular relay by the same amount as follows:

*Table IV*

| Row | Salients | Column (1) Pole $x$ | Column (1) Pole $y$ | Column (2) Pole $x$ | Column (2) Pole $y$ | Column (3) Pole $x$ | Column (3) Pole $y$ |
|---|---|---|---|---|---|---|---|
| 1 | 24–23 | $i_0$ | $-a^2 i_0$ | $i_0$ | $-i_1$ | $i_0$ | $-ai_2$ |
| 2 | 24–23 | $i_1$ | $-ai_0$ | $i_1$ | $-a^2 i_1$ | $i_1$ | $-i_2$ |
| 3 | 24–23 | $i_2$ | $-i_0$ | $i_2$ | $-ai_1$ | $i_2$ | $-a^2 i_2$ |
| 4 | 23–22 | $i_0$ | $i_0$ | $i_0$ | $i_1$ | $i_0$ | $i_2$ |
| 5 | 23–22 | $i_1$ | $a^2 i_0$ | $i_1$ | $a^2 i_1$ | $i_1$ | $a^2 i_2$ |
| 6 | 23–22 | $i_2$ | $a i_0$ | $i_2$ | $a i_1$ | $i_2$ | $a i_2$ |
| 7 | 22–21 | $i_0$ | $i_0$ | $i_0$ | $a^2 i_1$ | $i_0$ | $a i_2$ |
| 8 | 22–21 | $i_1$ | $i_0$ | $i_1$ | $a^2 i_1$ | $i_1$ | $a i_2$ |
| 9 | 22–21 | $i_2$ | $i_0$ | $i_2$ | $a^2 i_1$ | $i_2$ | $a i_2$ |
| 10 | 21–20 | $i_0$ | $-ai_0$ | $i_0$ | $-ai_1$ | $i_0$ | $-ai_2$ |
| 11 | 21–20 | $i_1$ | $-a^2 i_0$ | $i_1$ | $-a^2 i_1$ | $i_1$ | $-a^2 i_2$ |
| 12 | 21–20 | $i_2$ | $-i_0$ | $i_2$ | $-i_1$ | $i_2$ | $-i_2$ |

Referring to column 1 of Table IV, it will be observed that the relays of rows 1, 4, 7, and 10 all have the same currents associated with pole $x$ so that these four relays might be considered as one relay with the current $i_0$ associated with pole $x$ and the vector sum of the currents associated with the corresponding poles $y$ as the current for pole $y$ of the new relay. Thus, Table IV may re simplified so as to reduce to nine fictitious relays having poles $x$ and $y$ with the following currents therein:

*Table V*

| Relay | Pole $x$ | Pole $y$ |
|---|---|---|
| 1 | $i_0$ | $(-a^2 + 1 + 1 - a)i_0 = 3i_0$ |
| 2 | $i_1$ | $(-a + a^2 + 1 - a^2)i_0 = (1-a)i_0$ |
| 3 | $i_2$ | $(-1 + a + 1 - 1)i_0 = (a-1)i_0$ |
| 4 | $i_0$ | $(-1 + 1 + a^2 - a)i_1 = (a^2 - a)i_1$ |
| 5 | $i_1$ | $(-a^2 + a^2 - a^2 - a^2)i_1 = 0$ |
| 6 | $i_2$ | $(-a + a + a^2 - 1)i_1 = (a^2 - 1)i_1$ |
| 7 | $i_0$ | $(-a + 1 + a - a)i_2 = (1-a)i_2$ |
| 8 | $i_1$ | $(-1 + a^2 + a - a^2)i_2 = (a-1)i_2$ |
| 9 | $i_2$ | $(-a^2 + a + a - 1)i_2 = 3ai_2$ |

As was set forth above, the torque on the rotor of a relay having poles $x$ and $y$ due to the interaction of the fluxes produced by the windings on these poles may be represented by the following equation:

$$T = K I_x I_y \sin(\phi_x - \phi_y) \quad (4)$$

where the instantaneous values of the currents flowing in the energizing windings of poles $x$ and $y$ may be expressed as follows:

$$i_x = I_x \sin(\omega t + \phi_x) \quad (5)$$
$$i_y = I_y \sin(\omega t + \phi_y) \quad (6)$$

$I_x$ and $I_y$ are scalar quantities representing the magnitude of the currents, K is a constant and $\phi_x$ and $\phi_y$ represent the angular displacement of the instantaneous current values from a reference axis. The torque expressed by Equation 4, therefore, is a function of the product of the maximum current values energizing the respective poles multiplied by the sine of the angle between these currents. The torque for relays 1 to 9 of Table V may now be expressed in the form of Equation 4 wherein I is a scalar value of current and the associated subscript denotes whether the current is positive, negative, or zero-phase-sequence current. The subscripts associated with the torque term T denote whether the torque is a function of the combination of positive, negative, or zero-phase-sequence currents. Having assumed that torque in a counterclockwise direction is positive, the following torque equations may be written for relays 1 to 9 of Table V.

*Table VI*

| Relay | Torque |
|---|---|
| 1 | $T_{00} = 3KI_0^2 \sin 0° = 0$ |
| 2 | $T_{10} = \sqrt{3}KI_1I_0 \sin(\phi_1 - \phi_0 + 30°)$ |
| 3 | $T_{20} = \sqrt{3}KI_2I_0 \sin(\phi_2 - \phi_0 - 150°)$ |
| 4 | $T_{01} = \sqrt{3}KI_0I_1 \sin(\phi_0 - \phi_1 + 90°)$ |
| 5 | $T_{11} = 0$ |
| 6 | $T_{21} = \sqrt{3}KI_2I_1 \sin(\phi_2 - \phi_1 + 150°)$ |
| 7 | $T_{02} = \sqrt{3}KI_0I_2 \sin(\phi_0 - \phi_2 + 30°)$ |
| 8 | $T_{12} = \sqrt{3}KI_1I_2 \sin(\phi_1 - \phi_2 - 150°)$ |
| 9 | $T_{22} = 3KI_2^2 \sin(-120°) = -\dfrac{3\sqrt{3}KI_2^2}{2}$ |

The total torque on rotor 27 of electroresponsive device 14 will, therefore, be the sum of the torques of relays 1 to 9 from Table VI varied by a factor of 2 to take care of the remaining salients of electroresponsive device 14. Under balanced three-phase conditions, namely, when only positive-phase-sequence currents are applied to the windings 25 of electroresponsive device 14 and the negative and zero-phase-sequence components do not exist, it will be observed by inspection of the equations of Table VI that only relay 5 will be involved which produces zero torque. In other words, under balanced three-phase conditions, no torque is produced on rotor 27. On the other hand, when only negative-phase-sequence currents are applied to the windings 25, all of the equations of Table VI except the last will reduce to zero, and this equation shows that a torque in the clockwise direction is produced by the negative-phase-sequence currents to close the contacts 30 and, hence, trip circuit breaker 12. Thus, it is evident that electroresponsive device 14 produces a relay-operating torque when energized with negative-phase-sequence currents only but produces no torque at all when energized only with positive-phase-sequence current components. It will also be observed that the torque of relays 1 and 5 is 0 and that the torque of relays 6 and 8 are equal and opposite and hence will reduce to 0. The torque due to relays 2 and 4 may be combined and simplified as may also the torque due to relays 3 and 7. Therefore, the resultant torque in a counterclockwise direction on rotor 27 due to the energization as indicated in Figs. 2 and 3 may be expressed by the following equation:

$$T = \frac{3}{2}CI_0I_1[\sin(\phi_1 - \phi_0) + \sqrt{3}\cos(\phi_1 - \phi_0)] \\ -3CI_0I_2 \sin(\phi_2 - \phi_0) - \frac{3\sqrt{3}CI_2^2}{2} \quad (7)$$

where C is a new constant to take into consideration all the poles or salients of electroresponsive device 14. It will be observed that extraneous torques due to the zero-phase-sequence component exist but that, if no zero-phase-sequence component of current is present, Equation 7 reduces to the following equation:

$$T = -\frac{3\sqrt{3}CI_2^2}{2} \quad (8)$$

Thus, it will be observed that a negative-phase-sequence current will cause a clockwise torque on rotor 27 with the consequent clockwise rotation thereof and tripping of circuit breaker 12.

From the above discussion, it will be seen that I have provided a relay responsive to negative-phase-sequence currents wherein the use of a complicated network is not necessary to separate the various phase-sequence components if no zero-phase-sequence components are present which will be the case in many applications.

It will be understood by those skilled in the art that, if zero-phase-sequence currents are likely to be present, several simple schemes for eliminating these components are available either in the relay or before the currents are applied to the relay. For example, a Y-delta connected transformer may be used to eliminate the zero-phase-sequence component before the currents are applied to the relay, or the current transformers associated with the respective phases may be provided with sufficient windings so that the zero-phase-sequence component of current is subtracted from each phase current before the current enters the relay. The use of two coils on each pole of the relay also suggests itself for eliminating the effect of the zero-phase-sequence components.

By referring to Fig. 2, one may observe the physical relationships of the currents in the relays. It will be seen that the windings on poles or salients 21, 22, and 23 and 17, 18, and 19 produce a restraining torque on rotor 27. The windings of each group are energized by currents from a different phase so that, under balanced current conditions, a restraining torque will be applied to rotor 27. Under open-phase conditions, one of these currents will be zero while the other two will be in phase and hence no restraining torque will be produced. On the other hand, the windings associated with poles or salients 19, 20, and 21 and 23, 24, and 17 produce an operating torque on the rotor 27. The first group of windings, as may be observed from Fig. 2, is energized by currents from two of the phases while the second group of windings is energized by currents of the other phase. Under open-phase conditions, for example, if phase C were open, no torque would be produced due to poles 23, 24, and 17 but, by virtue of shaded pole 20, a torque will be produced by the flux from poles 19, 20, and 21 to cause operation of electroresponsive device 14 and tripping of circuit breaker 12.

It will be observed that, if the current terms in the equations set forth above were replaced by the corresponding voltage terms, a negative-phase-sequence voltage relay would result. Furthermore, if the connections of the relay were interchanged so that the windings energized with current $i_B$ were energized with current from phase C by a current $i_C$ and vice versa, Equation 8 would have contained a positive-phase-sequence current term instead of a negative-phase-sequence current term so that a positive-phase-sequence current relay instead of a negative-phase-sequence current relay would be obtained.

It will be understood by those skilled in the art that the relay constants may be so adjusted, if desired, that the phase-sequence component, either positive or negative, which produces no operating torque may be used to produce a restraining torque or additional operating torque as the case may be.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination with a system of polyphase alternating-current electric quantities, an electroresponsive device comprising a single movable current-conducting element, electromagnetic means for actuating said element comprising a multipole magnetic member including windings thereon, means for energizing said windings with said polyphase quantities in a predetermined order to provide an operating torque on said single movable current-conducting element dependent upon only one of the phase-sequence components of the electric quantities in said system.

2. In combination, a three-phase alternating-current system and a relay comprising a single rotatable current-conducting element, electromagnetic means for actuating said element comprising a multipole magnetic member, energizing windings associated with the poles of said magnetic member, means for energizing each of said windings with a similar electrical quantity of one of said three phases in a predetermined manner to provide an operating torque on said single rotatable current-conducting element dependent upon only one of the phase-sequence components of one of the electric quantities in said system.

3. In combination with a system of three-phase alternating-current electric quantities, an electroresponsive device comprising a single rotatable current-conducting element, electromagnetic means for actuating said element comprising a multipole magnetic member including windings thereon, means for energizing said windings with said three-phase quantities in a predetermined order to provide an operating torque on said single rotatable current-conducting element dependent upon only the negative-phase-sequence component of one of the electric quantities in said system.

4. In a polyphase alternating-current system having a plurality of phase currents flowing therein, a relay comprising a single rotatable current-conducting element, electromagnetic means for actuating said element comprising a magnetic member including a plurality of poles with energizing windings associated with said poles, means for energizing said windings with said phase currents in a predetermined order to provide an operating torque on said single rotatable current-conducting element dependent upon only the negative-phase-sequence current component in said system.

5. In combination, a device for protecting a polyphase circuit upon the failure of a portion of the phases thereof comprising a single movable current-conducting element, a magnetic member having a plurality of poles, energizing windings associated with said poles to produce a torque on said movable current-conducting element, means for energizing said windings from said polyphase circuit in a predetermined manner to provide an operating torque on said single movable current-conducting element dependent upon only the negative-phase-sequence current component indicating a phase failure in said circuit.

6. In combination, a three-phase alternating-current system, a current transformer associated with each of said phases, an electroresponsive device comprising a single rotatable current-conducting element, electromagnetic means for actuating said element comprising a magnetic member including a plurality of poles, energizing windings associated with said poles, means for energizing said windings from said current transformers in a predetermined order so as to provide an operating torque on said single rotatable current-conducting element dependent upon only the negative-phase-sequence current component in said system.

7. In combination with a system of three-phase alternating-current electric quantities, an electroresponsive device comprising a movable current-conducting element, electromagnetic means for actuating said element comprising a magnetic member including a plurality of poles, an energizing winding associated with each of said poles, means for energizing said windings from said three-phase system to provide four torque-producing units acting on said element to cause movement thereof when energized only with a particular phase-sequence component of one of said electric quantities while producing no torque when energized only with either of the other phase-sequence components of said one electric quantity.

8. In combination, a three-phase alternating-current system, a current transformer associated with each of said phases, an electroresponsive device comprising a movable current-conducting element, electromagnetic means for actuating said element comprising a magnetic member including eight poles symmetrically arranged around said member, an energizing winding associated with each of said poles, means for energizing said windings from said current transformers so as to provide four torque-producing units acting on said element to cause movement thereof when energized only with negative-phase-sequence currents while producing no torque when energized only with positive-phase-sequence currents.

9. In combination, a three-phase alternating-current system, a current transformer associated with each of said phases, an electroresponsive device comprising a movable current-conducting element, electromagnetic means for actuating said element comprising a magnetic member including a plurality of poles, an energizing winding associated with each of said poles, three of said windings each being energized from a different one of said current transformers producing fluxes resulting in a torque in one direction on said movable element, another of said windings being energized from one of said current transformers and cooperating with the one of said three windings energized from the same current transformer to produce a torque opposing said first-mentioned torque and means for producing an additional opposing torque comprising still another winding energized from one of said current transformers different from the one energizing said other winding cooperating with a different one of said three windings.

10. In combination with a system of three-phase alternating-current electric quantities, an electroresponsive device comprising a movable current-conducting element, electromagnetic means for actuating said element comprising a magnetic member including a plurality of poles, an energizing winding associated with each of said poles, said energizing windings being connected with said three-phase system to provide four torque-producing units acting on said element to cause movement thereof when energized with a predetermined plurality of phase-sequence components of said electric quantities, only a particular one of said phase-sequence components causing any resultant torque to be exerted on said movable element.

11. In combination with a system of three-phase alternating-current electric quantities, an electroresponsive device comprising a movable current-conducting element, electromagnetic means for actuating said element comprising a magnetic member, energizing windings associated with said magnetic member, said energizing windings being connected with said three-phase system so as to provide a plurality of torque-producing units acting on said element to cause movement thereof when energized with a predetermined plurality of phase-sequence components of said electric quantities, only a particular one of said phase-sequence components being effective to cause an operating torque to be exerted on said movable element while another of said phase-sequence components is effective to produce a restraining torque.

12. In combination with a system of three-phase alternating-current electric circuits, an electroresponsive device comprising a movable current-conducting element, electromagnetic means for actuating said element comprising a magnetic member including a plurality of poles, energizing windings associated with said poles, and means for energizing said windings from said three-phase system to provide a plurality of torque-producing units acting on said element to cause movement thereof when energized with a predetermined plurality of phase-sequence components of said electric quantities, only a particular one of said phase-sequence components causing any resultant torque to be exerted on said movable element.

ANDREW J. McCONNELL.

CERTIFICATE OF CORRECTION.

Patent No. 2,277,522.  March 24, 1942.

ANDREW J. McCONNELL.

It is hereby certified that error appears in the printed specification of the above numbered patent requiring correction as follows: Page 3, first column, line 28, Table II, last column thereof, for "$-i_0-i^1-i_2$" read -- $-i_0-i_1-i_2$ --; line 30, same table, second column thereof, for "$-,_0-a^2i_1-ai_2$" read -- $-i_0-a^2i_1-ai_2$ --; and second column, line 36, for "re" read --be--; and that the said Letters Patent should be read with this correction therein that the same may conform to the record of the case in the Patent Office.

Signed and sealed this 2nd day of June, A. D. 1942.

(Seal)

Henry Van Arsdale,
Acting Commissioner of Patents.